United States Patent Office 2,738,350
Patented Mar. 13, 1956

2,738,350

3-OXYGENATED 17α-AZA-D-HOMOANDRO-STENES AND N-SUBSTITUTED DERIVATIVES THEREOF

Robert H. Mazur, Evanston, Ill., assignor, by mesne assignments, to G. D. Searle & Co., Skokie, Ill., a corporation of Delaware No Drawing. Application March 16, 1954,
Serial No. 416,680

8 Claims. (Cl. 260—289)

This invention relates to 3-oxygenated 17a-aza-D-homoandrostenes, to N-substituted derivatives thereof, and to processes for manufacturing the aforesaid substances. More particularly, this invention relates to compounds of the formula

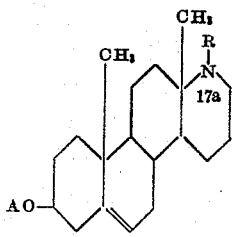

and their congeneric oxidation products having the formula

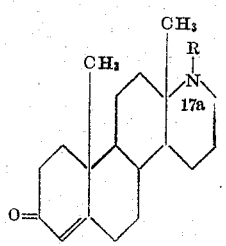

R in these formulas being hydrogen, a lower alkyl radical containing less than six carbon atoms, a saturated lower aliphatic acyl radical, a halogenated saturated lower aliphatic acyl radical, a benzoyl radical, or a benzyl radical; and A being, variously hydrogen, a lower aliphatic acyl radical or a benzoyl radical.

Among the lower alkyl radicals comprehended by R in the above formulas are, for example, methyl, ethyl, n-propyl, isopropyl, sec.-butyl, tert.-butyl, sec.-isoamyl, and like $C_nH_{2n+1}$ radicals wherein $n$ is a positive integer amounting to not more than five. For the purposes of this invention and in the foregoing structural formulas also, saturated lower aliphatic acyl radicals and halogenated saturated lower aliphatic acyl radicals are lower alkanoyl radicals defined by the formula $$-C=O$$
$$|$$
$$R'$$

wherein R' is an alkyl radical, sometimes halogen-substituted, containing less than 4 carbon atoms. Among the saturated lower aliphatic and halogenated saturated lower aliphatic acyl radicals embraced by the terms of this invention are formyl, acetyl, propionyl, butyryl, chloroacetyl, chloropropionyl, and bromobutyryl radicals.

Equivalent to the tertiary bases of this invention and likewise adapted to its uses are the non-toxic acid addition and quaternary ammonium salts formed by interaction of the unacylated compounds herein disclosed with, respectively, one equivalent of an inorganic or strong organic acid, or a lower alkyl ester or halide. These acid addition and quaternary ammonium salts may be represented by the formulas

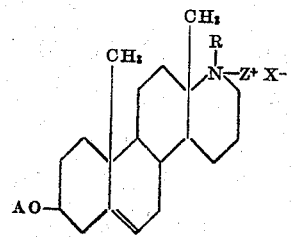

and

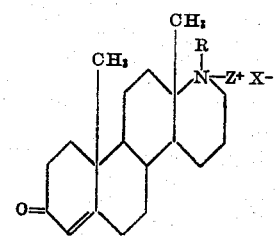

wherein A is defined as above; R is hydrogen, a lower alkyl radical containing less than six carbon atoms, or a benzyl radical; Z is hydrogen or a lower alkyl radical containing less than six carbon atoms; and X is one equivalent of an anion—for example, chloride, bromide, iodide, methyl sulfate, ethyl sulfate, benzenesulfonate, toluenesulfonate, tartrate, succinate, malate, acetate, citrate, nitrate, sulfate, phosphate, sulfamate, and the like—which, in combination with the cationic portion of a salt aforesaid, is neither toxic nor otherwise undesirable in pharmaceutical dosage.

The subject compounds are named in accordance with the suggestions on specifications of ring enlargements made by Ruzicka and Meldahl, Helv. Chim. Acta, 23,364 (1940), and recommended for adoption to the International Union of Pure and Applied Chemistry by their Commissions on Biochemical Nomenclature, a report of which is published in the June 23, 1951, issue of Chemistry and Industry.

The compounds to which this invention relates are valuable in medicine as cardioregulatory agents. Thus, for example, their capacity for exercising a depressant effect on the heart muscle commends their use in the treatment of auricular fibrillation and flutter, paroxysmal tachycardia, and divers other cardiac dysfunctions associated with rhythm changes in the heart caused by disturbances in the regular automaticity or conductance pattern of its beat. Additionally, the subject compounds are of importance as hypotensive agents, being capable of reducing elevated blood pressures characteristic of multiple disease states. Still further the compounds of this invention are useful as vasodilators. The augmentative effect on the volume of blood flow to the extremities finds rewarding application in the treatment of peripheral vascular disease, one of the commoner dyscrasias resulting from the degenerative changes of advancing years.

The amine bases of this invention are soluble in alcohols, as in most of the common organic solvents. The acid addition and quaternary ammonium salts herein disclosed are, on the other hand, readily soluble in water and in aqueous solutions of alcohols and other water-miscible organic solvents. The subject compounds may be administered in solid form as tablets or capsules; dissolved or suspended in aqueous alcohols, they may be given parenterally.

The claimed compounds are derived from 3β-acetoxy-17a - aza - D - homo - 5 - androsten - 17 - one. This material, upon lithium aluminum hydride reduction in accordance with usual techniques, yields 17a-aza-D-homo-5-androsten-3β-ol which, in turn, is converted to the corresponding N-methyl compound of this invention by means of the Eschweiler-Clarke reaction, using formaldehyde and formic acid. Optionally, 17a-aza-D-homo-5-androsten-3β-ol is N-acylated by interaction with an appropriate acid anhydride or halide—for example, acetic anhydride, chloroacetic anhydride, benzoyl chloride, or the like—in the presence of a base—pyridine, collidine, potassium carbonate, or the equivalent—and subsequently, selectively (in the 3-position) hydrolyzed where required—with, for example, 3% cold alcoholic alkali—to give such of the herein disclosed compounds as N-acetyl-17a-aza-D-homo-5-androsten-3β-ol, 17a-aza-N-chloroacetyl-D-homo-5-androsten-3β-ol, and 17a-aza-3β-benzoxy-N-benzoyl-D-homo-5-androstene. This latter compound is reduced with lithium aluminum hydride to the 3-hydroxy-N-benzyl derivative of this invention. Finally, the 3-oxo substances of the subject disclosure are derived from corresponding 3-hydroxy compounds by Oppenauer oxidation—for example, using cyclohexanone and aluminum isopropoxide.

The following examples will illustrate in detail certain of the compounds which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

17a-aza-D-homo-5-androsten-3β-ol.—A mixture of 245 parts of lithium aluminum hydride and approximately 10,000 parts of glycol dimethyl ether is heated at reflux temperatures in the solvent pot of a continuous extractor, the extraction chamber of which contains 628 parts of 3β - acetoxy - 17a - aza - D - homo - 5 - androsten - 17 - one, prepared by the method of S. Kaufmann, J. Amer. Chem. Soc., 73, 1779 (1951). After two days, the extraction is completed and just sufficient water introduced to decompose excess lithium aluminum hydride. Solvent is removed by distillation at reduced pressures, following which the relatively dry, powdery residue is extracted with a total of 1600 parts of boiling methyl alcohol. The extracts are concentrated to approximately one fourth volume, and an equal volume of water is then added. Upon cooling, 17a-aza-D-homo-5-androsten-3β-ol precipitates. Recrystallized from aqueous methyl alcohol, it shows M. P. 232.6—234.6° C., [α]$_D$ —92° (in chloroform). The product has the formula

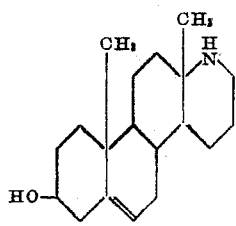

*Example 2*

17a-aza-D-homo-4-androsten-3-one.—To a solution of 10 parts of the hydroxy compound of the preceding Example 1 in 400 parts of pure dioxane is added 95 parts of cyclohexanone and an equal volume of a 20% solution of aluminum isopropoxide in toluene. This mixture is heated at reflux temperatures for 1 hour, following which it is treated with 1000 parts of a 50% aqueous Rochelle salt solution, and finally steam distilled. The oil which precipitates in the distilland is taken up in chloroform. The chloroform solution is washed with dilute aqueous potassium carbonate and then stripped of solvent by vacuum distillation. Chromatography of the residue on silica gel, using methyl alcohol as eluant, affords the desired 17a-aza-D-homo-4-androsten-3-one as a solid product which, crystallized from aqueous methyl alcohol, shows M. P. 132.5–134° C., [α]$_D$ +87° (in chloroform). The ultraviolet spectrum of a methyl alcohol solution shows a maximum at 240 millimicrons, with a molar extinction coefficient of 17,300. The product has the formula

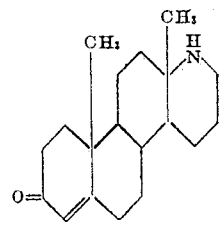

*Example 3*

17a - aza - N - methyl - D - homo - 5 - androsten - 3β - ol.—A solution of 20 parts of 17a-aza-D-homo-5-androsten-3β-ol—prepared by the procedure of Example 1—in 200 parts of 90% aqueous formic acid and 150 parts of 36% aqueous formaldehyde is heated at approximately 90° C. for 5 hours. An additional 108 parts of 36% formaldehyde is introduced, and heating is then continued at 75° C. for 16 hours. Solvents are stripped by distillation, following which the residue is warmed with approximately 85 parts of 8% methanolic potassium hydroxide. Upon addition of water, 17a-aza-N-methyl-D-homo-5-androsten-3β-ol precipitates. The product crystallizes from aqueous methyl alcohol in long, slender needles, M. P. 170.2–173.2° C., [α]$_D$ —73.5° (in chloroform). It has the formula

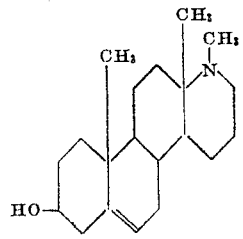

*Example 4*

17a-aza-N-methyl-D-homo-4-androsten-3-one.—A solution of 21 parts of the hydroxy compound of the preceding Example 3 in approximately 350 parts of toluene is heated at reflux temperatures for 2 hours with approximately 190 parts of cyclohexanone and an equal volume of a 20% solution of aluminum isopropoxide in toluene. The reaction mixture is worked up via the Rochelle salt-steam distillation procedure detailed in Example 2; and the crude product thus obtained is chromatographed on silica gel, using ethyl acetate and benzene as developing solvents. The 17a-aza-N-methyl-D-homo-4-androsten-3-one thus obtained, crystallized from aqueous methyl alcohol, shows M. P. 169–173° C., [α]$_D$ +109.5° (in chloroform). The ultraviolet spectrum of a methyl alcohol solution of this material shows a maximum at 240 millimicrons, with a molar extinction coefficient of 18,500. The product has the formula

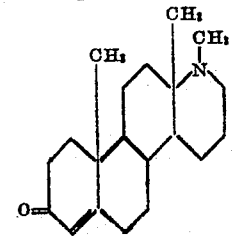

Example 5

A. *3β-acetoxy-N-acetyl-17a-aza - D - homo - 5 - androstene.*—Acetylation of 17a-aza-D-homo-5-androsten-3β-ol (Example 1) with acetic anhydride in pyridine solution according to usual techniques give the diacetate as transparent plates from aqueous methyl alcohol, M. P. 191.6–194.6° C., $[\alpha]_D$ —45° (in chloroform).

B. *N-acetyl - 17a-aza-D-homo - 5 - androsten-3β-ol.*—A solution of 22 parts of the diacetate of the preceding Part A in approximately 165 parts of cold 3% methanolic potassium hydroxide is allowed to stand overnight at room temperatures. Chloroform is then added, following which the solution is washed with dilute aqueous muriatic acid. Solvent is stripped by distillation and the residue thereupon crystallized from ethyl alcohol. The N-acetyl-17a-aza-D-homo-5-androsten-3β-ol thus obtained shows M. P. 271–273° C., $[\alpha]_D$ —49° (in chloroform). It has the formula

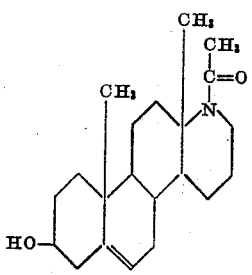

Example 6

*N-acetyl-17a-aza-D-homo-4-androsten-3-one.*—A solution of 24 parts of the hydroxy compound of the preceding Example 5B in approximately 1300 parts of dioxane is oxidized with 190 parts of cyclohexanone and an equal volume of a 20% toluene solution of aluminum isopropoxide by heating at reflux temperatures for 3½ hours. The reaction mixture is worked up by the Rochelle salt-steam distillation procedure described in Example 2; and the residue so derived is then chromatographed on silica gel, using 30% ethyl acetate-benzene as a developing solvent. Crystallization from a mixture of benzene and cyclohexane gives feathery needles, M. P. approximately 155–156° C., $[\alpha]_D$ +138° (in chloroform). The product thus obtained is N-acetyl-17a-aza-D-homo-4-androsten-3-one. The ultraviolet spectrum of a methyl alcohol solution is characterized by a peak at 241 millimicrons and a molar extinction coefficient of 16,450. The product has the formula

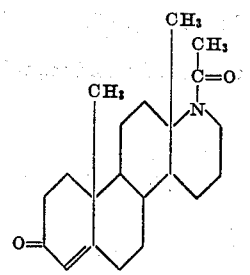

Example 7

A. *17a-aza - 3β-chloroacetoxy-N-chloroacetyl-D-homo-5-androstene.*—To a suspension of 53 parts of the 17a-aza-D-homo-5-androsten-3β-ol of Example 1 in a mixture of 917 parts of sym-collidine and 1490 parts of dry chloroform is added, portion-wise with cooling and agitation, 200 parts of chloroacetic anhydride, reaction temperatures being kept below 35° C. The steroid gradually dissolves. After standing overnight at room temperatures, the reactants are poured into cold dilute aqueous muriatic acid. The mixture is extracted with ether and this ether solution then, successively, washed with dilute aqueous caustic and dried over anhydrous sodium sulfate. Solvent is stripped by distillation and the residue then chromatographed on silica gel, using 5% ethyl acetate-benzene as a developing solvent. The dichloroacetate thus obtained, upon crystallization from a mixture of benzene and cyclohexane, shows M. P. approximately 172–173° C., $[\alpha]_D$ —42° (in chloroform).

B. *17a - aza-N-chloroacetyl - D - homo - 5 - androsten-3β-ol.*—A solution of 79 parts of the dichloroacetate of the preceding Part A in 7900 parts of warm methyl alcohol containing 80 parts of potassium hydroxide is allowed to stand at room temperatures for 1 hour. The solution is then diluted with 20,000 parts of ice water, precipitating the desired 17a-aza-N-chloroacetyl-D-homo-5-androsten-3β-ol as a solid product which crystallizes from ethyl alcohol in small prisms, M. P. approximately 260–261° C. (with decomposition), $[\alpha]_D$ —62° (in chloroform). The material has the formula

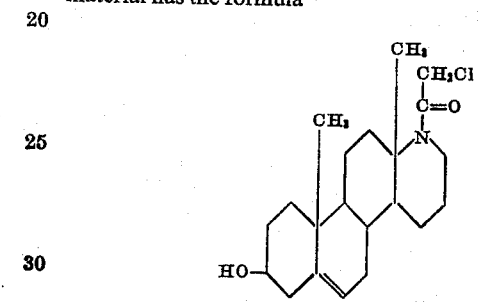

Example 8

*17a - aza - N - chloroacetyl - D - homo - 4 - androsten - 3-one.*—A solution of 13 parts of the hydroxy compound of the preceding Example 7B in approximately 410 parts of dioxane is refluxed for 1 hour with a mixture of 115 parts of cyclohexanone and ⅔ that volume of 20% aluminum isopropoxide in toluene. A gel separates in process. The reaction mixture is extracted with chloroform, the chloroform solution is washed with dilute aqueous muriatic acid and then dried over anhydrous sodium sulfate, and solvent is stripped by distillation, in that order. The residue, a moble liquid, is chromatographed on silica gel, using benzene and ethyl acetate as developing solvents. By this means is obtained 17a-aza-N-chloroacetyl-D-homo-4-androsten-3-one which, twice recrystallized from a mixture of benzene and cyclohexane, shows M. P. approximately 151° C., $[\alpha]_D$ +118° (in chloroform). The ultraviolet spectrum of a methyl alcohol solution shows a maximum at 239 millimicrons, with a molar extinction coefficient of 19,500. The product has the formula

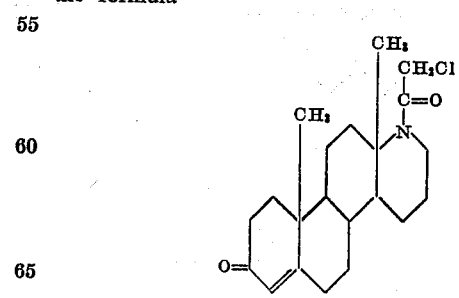

Example 9

A. *17a-aza-3β-benzoxy-N-benzoyl-D-homo - 5 - androstene.*—A solution of 30 parts of 17a-aza-D-homo-5-androsten-3β-ol—prepared by the method of Example 1—in 880 parts of dry pyridine is heated to boiling with 180 parts of benzoyl chloride. The reactants are then allowed to stand at room temperatures for 2 hours, following which they are poured into ice water. The solid product thus precipitated is isolated by filtration and washed on the filter, successively, with dilute aqueous muriatic acid, dilute aqueous alkali, and finally water. Chromatographed on silica gel, using 10% ethyl acetate-benzene as developing solvent, the material comes out of aqueous ethyl alcohol as colorless, short needles, M. P. 216.5–218.5° C., $[\alpha]_D$ —9° (in chloroform).

B. *17a - aza - N - benzyl - D - homo - 5 - androsten - 3β-ol.*—To a suspension of 100 parts of lithium aluminum hydride in glycol dimethyl ether is added 27 parts of the dibenzoate of the preceding Part A. The mixture is heated at the boiling point for 6 hours, following which excess hydride is decomposed with 33% aqueous potash. The organic layer is separated and then stripped of solvent by distillation. Chromatography of the residue on silica gel, using 10% ethyl acetate-benzene as developing solvent, affords the desired 17a-aza-N-benzyl-D-homo-5-androsten-3β-ol, which, crystallized from aqueous methyl alcohol, shows M. P., approximately 134–135° C., $[\alpha]_D$ —38° (in chloroform). The product has the formula

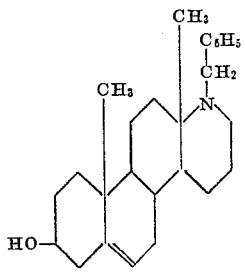

I claim:
1. A compound selected from the group consisting of compounds of the formula

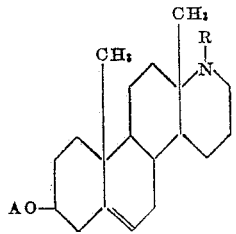

and congeneric oxidation products thereof having the formula

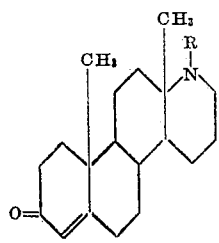

R in these formulas being selected from the group consisting of hydrogen, methyl radicals, lower alkanoyl radicals, halogenated lower alkanoyl radicals, benzoyl radicals, and benzyl radicals; and A being selected from the group consisting of hydrogen, lower alkanoyl radicals, and benzoyl radicals.

2. 17a-aza-D-homo-5-androsten-3β-ol.
3. A compound of the formula

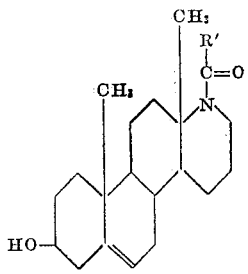

wherein R' is an alkyl radical containing less than 4 carbon atoms.

4. N - acetyl - 17a - aza - D - homo - 5 - androsten - 3β-ol.
5. 17a - aza-N - methyl - D - homo - 4 - androsten -3 - one.
6. A compound of the formula

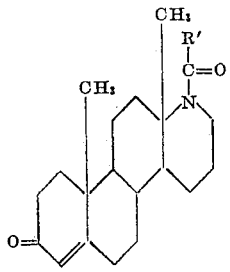

wherein R' is an alkyl radical containing less than 4 carbon atoms.

7. N - acetyl - 17a - aza - D - homo - 4 - androsten - 3-one.
8. 17a - aza - N - chloroacetyl - D - homo - 5 - androsten-3β-ol.

References Cited in the file of this patent

FOREIGN PATENTS 803,227     France _____ June 29, 1936

OTHER REFERENCES

Mosettig et al.: J. Org. Chem., vol. 3, pp. 317–39 (1938).

St. Kaufmann: J. Am. Chem. Soc., vol. 73, pp. 1779–80 (1951).